(12) United States Patent
Schrader et al.

(10) Patent No.: US 6,350,813 B1
(45) Date of Patent: Feb. 26, 2002

(54) HIGH IMPACT MONOVINYLIDENE AROMATIC POLYMERS

(75) Inventors: David Schrader; Steven M. Black, both of Midland, MI (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/448,818

(22) Filed: Nov. 24, 1999

Related U.S. Application Data

(60) Provisional application No. 60/119,232, filed on Feb. 9, 1999.

(51) Int. Cl.⁷ .............................................. C08F 279/02
(52) U.S. Cl. .............................. 525/89; 525/98; 525/99
(58) Field of Search ................................ 525/89, 98, 99

(56) References Cited

U.S. PATENT DOCUMENTS 5,708,081 A    1/1998    Sarraf et al.

FOREIGN PATENT DOCUMENTS

| EP | 277 687 A2 | 8/1988 |
|---|---|---|
| JP | 61266448 | 11/1986 |
| JP | 61-266448 | * 11/1986 |
| WO | WO 95/15348 | 6/1995 |

* cited by examiner

*Primary Examiner*—Jeffrey Mullis

(57) ABSTRACT

The present invention refers to a rubber modified monovinylidene aromatic polymer composition wherein the rubber is in the form of discrete, dispersed rubber particles and comprises:

a) from 75 to 25 weight percent based on the total weight of rubber, of a star branched diene rubber, having a cis 1,4 structure content of less than 75 percent; and b) from 25 to 75 weight percent, based on the total weight of rubber, of a linear diene rubber, having a cis 1,4 structure content of less than 50 percent.

9 Claims, No Drawings

HIGH IMPACT MONOVINYLIDENE AROMATIC POLYMERS

CROSS REFERENCE STATEMENT

This application claims the benefit of U.S. Provisional Application No. 60/119,232, filed Feb. 9, 1999.

BACKGROUND OF THE INVENTION

The process of the present invention relates to high impact rubber modified monovinylidene aromatic polymers.

Past research has focused on the production of high impact modified monovinylidene aromatic polymers, having a good balance of gloss and impact properties. Various rubbers have been used, such as block copolymer rubbers, in order to increase the impact strength without sacrificing the gloss of the final molded product. However, the use of block rubbers significantly increases the cost of production. Additionally, star branched rubbers have also been used, however the desired balance of gloss and impact strength is not obtained. U.S. Pat. No. 5,708,081 discloses a high impact vinyl aromatic polymer obtained by virtue of two polybutadienes, wherein one has a high viscosity and cis 1,4 structure of greater than 80 percent, while the other has a low viscosity and cis 1,4 structure of less than 80 percent. However, this composition also does not obtain the desired balance of gloss and impact properties.

Therefore, there still remains a need for a cost effective solution to the problem of obtaining increased gloss of an impact modified monovinylidene aromatic polymer, while maintaining high impact properties.

SUMMARY OF THE INVENTION

The present invention is a rubber modified monovinylidene aromatic polymer composition comprising:

I) a matrix comprising a monovinylidene aromatic polymer, and

II) a rubber, in the form of discrete dispersed rubber particles, dispersed within the matrix, wherein the rubber comprises:
   a) from 75 to 25 weight percent of a star branched diene rubber, having a cis 1,4 structure content of less than 75 weight percent; and
   b) from 25 to 75 weight percent of a linear diene rubber, having a cis 1,4 structure content of less than 50 weight percent.

This composition has been found to have increased gloss, while maintaining excellent impact properties, in comparison to other compositions containing a low cis star branched diene rubber.

DESCRIPTION OF THE PREFERRED EMBODIMENTS

Monovinylidene aromatic polymers suitable for use as the matrix in the composition of the present invention are those produced by polymerizing a vinyl aromatic monomer. Vinyl aromatic monomers include, but are not limited to those described in U.S. Pat. Nos. 4,666,987, 4,572,819 and 4,585,825, which are herein incorporated by reference. Preferably, the monomer is of the formula:

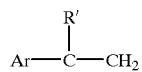

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. The polymerization of the vinyl aromatic monomer is conducted in the presence of predissolved elastomer to prepare impact modified, or grafted rubber containing products, examples of which are described in U.S. Pat. Nos. 3,123,655, 3,346,520, 3,639,522, and 4,409,369, which are incorporated by reference herein.

The rubber present in the composition of the present invention is in the form of discrete, dispersed rubber particles comprised of a) a star branched diene rubber having a cis 1,4 structure content of less than 75 weight percent, and b) a linear diene rubber, having a cis 1,4 structure content of less than 50 weight percent. It has been surprisingly discovered that a blend of such rubbers will perform as well or better than compositions wherein the star branched rubber is used alone. The star branched rubber of a) is a low viscosity rubber having a solution viscosity (5% in styrene at 20 C.) in the range of 20 to 120 centipoise (cps), preferably 25 to 100, more preferably 25 to 60 and most preferably 30 to 50, and a Mooney viscosity (ML4, 100 C.) of 30 to 80, preferably 35 to 75, more preferably 35 to 60 and most preferably 50 to 60. Suitable rubbers include radial or star branched rubbers having three or more polymer segments bonded to a single polyfunctional element or compound, and branched rubbers having a cis 1,4 structure content of less than 75 weight percent and at least one, or a significant number of subordinate chains of sufficient length such that the viscosity of the rubber is less than the viscosity of a linear polymer of the same monomeric components and same molecular weight. These rubbers typically have a relatively high average molecular weight, a relatively low solution viscosity and a medium to high Mooney viscosity. In general, the solution viscosity for the rubber will be below 120 cps, while the Mooney viscosity will be less than 80.

The radial or star branched rubber preferably employed in the present invention, typically exhibits a second order transition temperature not higher than about 0 C., and preferably not higher than about –20 C. Suitable rubbers include alkadienes which include 1,3-conjugated dienes such as butadiene, isoprene, chloroprene or piperylene. Most preferred are homopolymers prepared from 1,3-conjugated dienes, with homopolymers of 1,3-butadiene being especially preferred. Alkadiene copolymer rubbers containing small amounts, for example up to 10 or 15 weight percent, of other monomers such as vinyl aromatics can also be employed if the rubbers meet the other qualifications described herein.

Rubbery polymers having random branching, as well as methods for their preparation, are known in the art and reference is made thereto for the purpose of this invention. Representative branched rubbers and methods for their preparation are described in Great Britain Patent No. 1,130, 485 and in *Macromolecules,* Vol. II, No. 5, pg. 8, by R. N. Young and C. J. Fetters.

Radial or star branched polymers, commonly referred to as polymers having designed branching, are conventionally prepared using a polyfunctional coupling agent or a polyfunctional initiator. Methods for preparing star branched or radial polymers having designed branching are well-known in the art. Methods for preparing a polymer of butadiene using a coupling agent are illustrated in U.S. Pat. Nos. 4,183,877; 4,340,690; 4,340,691 and 3,668,162, whereas methods for preparing a polymer of butadiene using a polyfunctional initiator are described in U.S. Pat. Nos. 4,182,818; 4,264,749; 3,668,263 and 3,787,510, all of which are herein incorporated by reference.

As known by those skilled in the art, various techniques such as control of the branching and molecular weight control can be used to adjust and tailor these polymers to achieve the necessary solution and Mooney viscosities, as well as the ratio of these two.

The linear diene rubber of b) can be any linear diene rubbery polymer having a cis 1,4 structure content of less than 50, preferably less than 45, and more preferably less than 40 weight percent. Preferred rubbery polymers include a homopolymer or copolymer of an alkadiene or a ethylene-propylene copolymer optionally containing a non-conjugated diene. More preferably, the rubber is a homopolymer of a 1,3-conjugated diene such as butadiene, isoprene, piperylene, chloroprene and the like, or a copolymer of a conjugated diene with one or more vinyl aromatic monomers such as styrene; alpha, beta-ethylenically unsaturated nitrites such as acrylonitrile; alpha-olefins such as ethylene or propylene, and the like. Most preferred rubbers are homopolymers of 1,3-butadiene and block or random copolymers of at least about 30, more preferably from about 50 to about 90, weight percent 1,3-butadiene and up to about 70, more preferably from about 5 to about 50, weight percent of a vinyl aromatic compound, preferably styrene. In a preferred embodiment, the rubber of a) is a polybutadiene and the rubber of b) is a polybutadiene or a poly(butadiene-styrene)block copolymer.

The amount of rubber initially dissolved in the vinyl aromatic monomer is dependent on the desired concentration of the rubber in the final rubber-reinforced polymer product, the degree of conversion during polymerization and the viscosity of the solution. Typically, the amount of rubber initially dissolved in the vinyl aromatic is from 8, preferably from 8.5, more preferably from 9 and most preferably from 9.5 to 15, preferably to 14, more preferably to 13 and most preferably to 12 weight percent, based on the total weight of the composition.

The rubber is typically used in amounts such that the rubber-reinforced polymer product contains from 2, preferably from 3, more preferably from 4 and most preferably from 5 to 20, preferably to 17 percent, more preferably to 15 and most preferably to 12 weight percent rubber, based on the total weight of the vinyl aromatic monomer and rubber components, expressed as rubber or rubber equivalent. The term "rubber" or "rubber equivalent" as used herein is intended to mean, for a rubber homopolymer, such as polybutadiene, simply the amount of rubber, and for a block copolymer, the amount of the copolymer made up from monomer which when homopolymerized forms a rubbery polymer, such as for a butadiene-styrene block copolymer, the amount of the butadiene component of the block copolymer.

The composition of the present invention advantageously contains from 25, generally from 30, preferably from 35, more preferably from 40, and most preferably from 45 to 75, generally to 70, preferably to 65, more preferably to 60 and most preferably to 55 weight percent of the star branched rubber, based on the total weight of the rubber.

The composition of the present invention advantageously contains from 75, generally from 70, preferably from 65, more preferably from 60, and most preferably from 55 to 25, generally to 30, preferably to 35, more preferably to 40 and most preferably to 45 weight percent of the linear diene rubber based on the total weight of the rubber.

The rubber particles typically have a volume average particle size of from 0.2 to 1.2 microns. If a bimodal particle size is produced, the rubber typically comprises from approximately 80 to 85 weight percent of the aforementioned particles and from about 5 to 20 weight percent of particles having a volume average particle size of from 2 to 6 microns.

Polymerization processes and process conditions for the polymerization of vinyl aromatic monomers, production of rubber modified polymers thereof and the conditions needed for producing the desired average particle sizes, are well known to one skilled in the art. Although any polymerization process can be used, typical processes are continuous bulk or solution polymerizations as described in U.S. Pat. Nos. 2,727,884 and 3,639,372, which are incorporated herein by reference.

The polymerization is preferably conducted in the presence of an initiator. Suitable initiators include any initiator capable of imparting the desired grafting of polymer to the rubber particle under the conditions of polymerization and accelerating the polymerization of the vinyl aromatic monomer. Representative initiators include peroxide initiators such as peresters, e.g. tertiary butyl peroxybenzoate and tertiary butyl peroxyacetate, tertiary butyl peroxyoctoate, dibenzoyl peroxide, dilauroyl peroxide, 1.1-bis tertiarybutyl peroxycyclohexane, 1-3-bis tertiarybutylperoxy-3,3,5-trimethyl cyclohexane, di-cumyl peroxide, and the like. Photochemical initiation techniques can be employed if desired. Preferred initiators include tertiary butyl peroctoate, tertiary butyl isopropyl percarbonate, dibenzoyl peroxide, tertiary butyl peroxy benzoate, 1,1-bistertiarybutylperoxy cyclohexane and tertiarybutylperoxy acetate.

Initiators may be employed in a range of concentrations dependent on a variety of factors including the specific initiators employed, the desired levels of polymer grafting and the conditions at which the mass polymerization is conducted. Specifically, initiators may be employed in amounts from 0 to 2000, preferably from 100 to 1500, parts by weight per million parts by weight of vinyl aromatic monomer.

Additionally, a solvent may be used in the polymerization. Acceptable solvents include normally liquid organic materials which form a solution with the rubber, vinyl aromatic monomer and the polymer prepared therefrom. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred solvents include substituted aromatics, with ethylbenzene and xylene being most preferred. In general, the solvent is employed in amounts sufficient to improve the processability and heat transfer during polymerization. Such amounts will vary depending on the rubber, monomer and solvent employed, the process equipment and the desired degree of polymerization. If employed, the solvent is generally employed in an amount of up to about 35 weight percent, preferably from about 2 to about 25 weight percent, based on the total weight of the solution.

Other materials may also be present in the process of the present invention, including plasticizers, e.g. mineral oil; flow promoters, lubricants, antioxidants, catalysts, mold release agents, or polymerization aids such as chain transfer agents, including alkyl mercaptans, e.g. n-dodecyl mercaptan. If employed, a chain transfer agent can be present in an amount of from about 0.001 to about 0.5 weight percent based on the total weight of the polymerization mixture to which it is added.

The temperature at which the polymerization is conducted will vary according to the specific components, particularly initiator, but will generally vary from about 60 to about 190 C.

Crosslinking of the rubber in the resulting product and removal of the unreacted monomers, as well as any solvent, if employed, and other volatile materials is advantageously conducted employing conventional techniques, such as introducing the polymerization mixture into a devolatilizer, flashing off the monomer and other volatiles at elevated temperature, e.g. from 200 to 300 C. under vacuum and removing them from the devolatilizer.

Typically, a bimodal composition is produced by polymerizing a feed of the desired components and a grafting initiator in a series of reactors, wherein the rubber particles are formed and stabilized within the first reactor, then fed to the top of a second reactor, wherein a second feed is added. The second feed may already contained sized rubber particles or may be another monomer/rubber raw material feed which will produce large particles. Methods of preparing bimodal particle size polymers are disclosed in U.S Pat. No. 5,240,993, which is incorporated herein by reference, and in EP-0096447.

In one embodiment, a portion of the initial feed from the first reactor is additionally fed into the second reactor, preferably at approximately the midpoint of said second reactor. The polymerization mixture containing the rubber particles produced from the first reactor is rapidly mixed with the non-polymerized feed in the second reactor, and rapid phase inversion of the second feed results in the formation of rubber particles having a dense type morphology, and is referred to herein as a "second add" process. To obtain the dense type morphology, the polymerization mixture containing the particles of the first reactor is mixed with the unpolymerized feed in the second reactor, under conditions such that the resultant mixture has a solids content of at least 4 to 5 times the rubber content. The size of the dense particles can be controlled by controlling the agitation and the solids content in the second reactor as is well known in the art.

Due to the excellent balance of gloss and toughness properties, these rubber-reinforced compositions are useful in a wide variety of applications such as consumer electronics, small household appliances, toys and furniture. These polymers are also useful in extrusion applications such as in the preparation of a gloss layer using coextrusion techniques for refrigerator liners.

As used herein, the volume average particle size refers to the diameter of the rubber particles, including all occlusions of vinyl aromatic polymer within the rubber particles. Volume average particle sizes and distributions may be measured using conventional techniques such as a Coulter Counter™, transmission electron microscopy image analysis, or Shimadzu light scattering technique.

The following examples are provided to illustrate the present invention. The examples are not intended to limit the scope of the present invention and they should not be so interpreted. Amounts are in weight parts or weight percentages unless otherwise indicated.

EXAMPLES

The following high impact polystyrene (HIPS) examples are prepared using three linear stirred tube reactors, each reactor having three temperature control zones, the temperatures being 105, 115, 120, 125, 135, 145, 150, 155, and 160 C., a feed rate of 550 g/hr, a n-dodecylmercaptan (99.5 wt. percent ethylbenzene and 0.5 wt. percent n-dodecylmercaptan) feed rate of 20 g/hr (added to the second reactor in zone 4), and an agitation rpm in the reactors of 125, 40 and 25 respectively. The feed contains 6.5 wt. percent ethylbenzene, 1.5 wt. percent mineral oil and 8 wt. percent rubber in ratios as specified in Table I. Examples 6–8 also include a "second add" process wherein the main feed composition is also added at a rate of 33 g/hr to the second reactor in zone 5.

TABLE I

|  | Ex. 1* | Ex. 2* | Ex. 3 | Ex. 4 | Ex. 5 | Ex. 6 | Ex. 7 | Ex.8 |
|---|---|---|---|---|---|---|---|---|
| Rubber type (% in feed) | | | | | | | | |
| % HX565 (star branched) | 0 | 100 | 50 | 75 | 25 | 25 | 75 | 50 |
| % Diene 55 (linear) | 100 | 0 | 50 | 25 | 75 | 75 | 25 | 50 |
| % second add | 0 | 0 | 0 | 0 | 0 | 0 | 0 | 0 |
| Final Mw (g/mole) | 198900 | 196900 | 190500 | 189900 | 196600 | 197600 | 193400 | 194500 |
| Shimadzu particle size ( ) | 1.01 | 0.6 | 0.69 | 0.61 | 0.95 | 1.84 | 1.74 | 1.82 |
| Compression | | | | | | | | |
| Ty(psi) | 3200 | 3540 | 3360 | 3510 | 3130 | 2840 | 3190 | 3070 |
| (Mpa) | 22.1 | 24.4 | 23.2 | 24.2 | 21.6 | 19.6 | 22.0 | 21.2 |
| Tr (psi) | 2160 | 2530 | 2410 | 2550 | 2500 | 2080 | 2250 | 2160 |
| (MPa) | 14.9 | 17.4 | 16.6 | 17.6 | 17.2 | 14.3 | 15.5 | 14.9 |

TABLE I-continued

|  | Ex. 1* | Ex. 2* | Ex. 3 | Ex. 4 | Ex. 5 | Ex. 6 | Ex. 7 | Ex.8 |
|---|---|---|---|---|---|---|---|---|
| Tm (psi) × $10^5$ | 2.37 | 2.74 | 2.48 | 2.64 | 2.38 | 2.3 | 2.55 | 2.54 |
| (MPa) | 1634 | 1890 | 1710 | 1821 | 1641 | 1586 | 1759 | 1752 |
| Elongation (%) | 23 | 24 | 25 | 20 | 10 | 46 | 23 | 24 |
| Izod (ft. lb/in) | 2.6 | 1.1 | 2 | 1.2 | 2.6 | 2.8 | 1.9 | 2.5 |
| (J/M) | 140.4 | 59.4 | 108 | 64.8 | 140.4 | 151.2 | 102.6 | 135 |
| MFR (g/10 min.) | 3.09 | 3.92 | 3.74 | 3.75 | 3.29 | 3.22 | 3.83 | 3.55 |
| Injection |  |  |  |  |  |  |  |  |
| Gloss 60:par (%) | 85 | 97 | 95 | 96 | 89 | 85 | 93 | 91 |
| Gloss 20:par(%) | 40 | 74 | 65 | 71 | 49 | 41 | 60 | 55 |

*COMPARATIVE EXAMPLES
HX565 is a star branched rubber having a 1,4 cis content of 36 weight percent, available from Bayer.
Diene 55 is a linear diene rubber having a 1,4 cis content of 38 weight percent available from Firestone.
Ty is tensile yield.
Tr is tensile rupture.
Tm is tensile modulus.

Compositions containing from 25 to 75 percent of the Diene (linear, low cis) rubber have equal or better properties than the HX565(star branched, low cis) rubber alone.

What is claimed is:

1. A rubber modified monovinylidene aromatic polymer composition comprising
   I) a matrix comprising a monovinylidene aromatic polymer, and
   II) a rubber, in the form of dispersed rubber particles within the matrix, wherein the rubber particles are prepared from a blend of:
      a) from 75 to 25 weight percent based on the total weight of rubber, of a star branched diene rubber, having a cis 1,4 structure content of less than 75 percent; and
      b) from 25 to 75 weight percent, based on the total weight of rubber, of a linear diene rubber, having a cis 1,4 structure content of less than 50 percent;
   wherein the viscosity of the star branched diene rubber is less than the viscosity of the linear diene rubber.

2. The composition of claim 1 wherein the matrix is a styrene polymer.

3. The composition of claim 1 wherein the rubber of a) is from 30 to 70 weight percent of the total rubber.

4. The composition of claim 1 wherein the rubber of a) is a butadiene homopolymer.

5. The composition of claim 1 wherein the rubber of b) is a butadiene homopolymer.

6. The composition of claim 1 wherein the rubber of b) is from 30 to 70 weight percent of the total rubber.

7. The composition of claim 1 wherein the matrix is a styrene polymer, rubber a) is a polybutadiene and rubber b) is a polybutadiene.

8. The composition of claim 7 wherein the rubber of a) is present in an amount of from 40 to 60 weight percent and the rubber of b) is present in an amount of from 40 to 60 weight percent, based on the total weight of the rubber.

9. The composition of claim 8 wherein the total rubber content is from 8 to 15 weight percent, based on the total weight of the composition.

* * * * *